United States Patent [19]
Clifford et al.

[11] Patent Number: 5,627,960
[45] Date of Patent: May 6, 1997

[54] UNIFIED HIERARCHICAL AND TEAR OFF MENUS IN A GRAPHICAL EVENT-DRIVEN COMPUTER SYSTEM

[75] Inventors: Daniel K. Clifford, Palo Alto; Timothy J. Craycroft, Mountian View, both of Calif.

[73] Assignee: Apple Computer, Inc., Cupertino, Calif.

[21] Appl. No.: 610,518

[22] Filed: Mar. 4, 1996

Related U.S. Application Data

[63] Continuation of Ser. No. 242,674, May 13, 1994, abandoned.

[51] Int. Cl.⁶ .................................................. G06F 3/14
[52] U.S. Cl. ...................................... 395/352; 395/356
[58] Field of Search ............................. 395/155, 156, 395/157, 158, 159, 160, 161; 345/112, 113

[56] References Cited

U.S. PATENT DOCUMENTS

| | | | |
|---|---|---|---|
| 4,931,783 | 6/1990 | Atkinson | 340/710 |
| 5,063,600 | 11/1991 | Norwood | 382/186 |
| 5,220,675 | 6/1993 | Padawer et al. | 395/800 |
| 5,283,560 | 2/1994 | Bartlett | 345/113 |
| 5,287,514 | 2/1994 | Gram | 395/700 |
| 5,363,482 | 11/1994 | Victor et al. | 395/157 |

OTHER PUBLICATIONS

"Menu Method", *IBM Technical Disclosure Bulletin*, 32(4a):285–286 (1989).
"Menu Manager", *IBM Technical Disclosure Bulletin*, 34(12):113–116 (1992).
International Search Report, *PCT/US95/06021*, filed May 15, 1995.

*Primary Examiner*—Mark R. Powell
*Assistant Examiner*—Ruay Lian Ho
*Attorney, Agent, or Firm*—Burns, Doane, Swecker & Mathis, L.L.P.

[57] ABSTRACT

Explicit support is provided at the system software level for application program tear-off menus in a manner that is essentially application-transparent. All menus are transformed into windows and grouped in a single menu layer for each application, greatly simplifying many of the complexities of navigating through hierarchical and tear-off menus. Each application has its own menu layer that is shown and hidden as the application moves to the foreground and background. Tear-off menus, as with all menus, are hidden and shown with the menu layer, generating the desirable "floating-window" behavior. More particularly, menus are managed in a graphical, event-driven computer system having a computer display by representing the menus as windows, providing a menu layer for containing menus of a computer program, and displaying a menu. Events occurring with respect to the menu layer are detected, in response to which display of the menu is varied.

10 Claims, 6 Drawing Sheets

UNIFIED HIERARCHICAL AND TEAR OFF MENUS IN A GRAPHICAL EVENT-DRIVEN COMPUTER SYSTEM

This application is a continuation of application Ser. No. 08/242,674, filed May 13, 1994 now abandoned.

BACKGROUND OF THE INVENTION

1. Field of the Invention

The present invention relates to graphical, event-driven computer systems, more particularly to menu management in a computer system having a graphical user interface.

2. State of the Art

A large amount of effort has been devoted to improving the ease of using computer systems. One area where this is especially evident is that of computer user interfaces. For example, the use of windows, icons and pull-down, pop-up, or tear-off menus greatly enhances the ease of using a computer system. Pull-down menus, for instance, contain commands which are logically grouped so that specific commands may be located and executed quickly.

The term "menu" is used to refer to a graphical representation of a collection of related items consisting of text, pictures or other symbols. Each item can be either in a non-highlighted or highlighted state, which allows a user to interactively choose an item from a menu, with feedback indicated by a single highlighted item in the menu that indicates to the user what his or her current selection is.

One computer system which makes extensive use of pull-down menus is the Macintosh computer system manufactured by Apple Computer, Inc. In the Macintosh operating system, a mechanism is provided wherein multiple pull-down menus may be used at the operating system level or by application programs. In this system, each individual menu and each menu command is defined by embedded computer code which is compiled at the time of creating a program or whenever updating the computer operating system. (The term "window" is used herein to denote self-contained drawing environments as in the Macintosh computer.)

Especially useful are hierarchical menus and tear-off menus. Hierarchical menus are menus that contain sub-menus. In particular, some menu items have sub-menus associated with them which allow users to navigate through multiple levels of menus and sub-topics. As the user selects items with sub-menus, the sub-menus are temporarily displayed after a short delay to allow users to select from the items in the sub-menu. Tear-off menus are menus that may be removed from the menu bar and drawn as windows on the display screen. The menu window may then be repositioned on the display screen or may be closed and thereby removed from the screen. In effect, a tear-off menus is a persistent copy of a normal menu that remains visible after the menu selection process is complete. Tear-off menus can only be dismissed by an explicit user action. Tear-off menus are the subject of U.S. Pat. No. 4,931,783 to Atkinson, assigned to Apple Computer and incorporated herein by reference, and are used in the Hypercard and MacPaint application programs available from Apple Computer as well as in numerous other application programs.

Hierarchical menus are supported extensively by Macintosh system software, principally by the Menu Manager. Tear-off menus, on the other hand, have not been explicitly supported by system software. Rather, providing tear-off menus, if desired, has been the responsibility of individual applications, requiring a significant amount of application code. Associated with such code is an equally significant amount of processing overhead, since hierarchical menus and tear-off menus have been provided for separately.

This situation is illustrated in FIG. 1. Although the description of FIG. 1 and subsequent figures most closely describes the Macintosh system software, the same principles are applicable to other operating system environments and to any graphical, event-driven computer system. In FIG. 1, an Event Manager 11 responds to user input events such as keyboard events and mouse events. These events are passed to an application program 15. A sequence of such events might represent a tear-off gesture, for example, by which a user indicates a desire to tear-off a menu to create a persistent copy displayed within a menu window. The application must be able to recognize and respond to the tear-off gesture. Program code 19 is provided within the application for this purpose. In response to the tear-off gesture, the application program makes calls to a collection of window display routines (the Window Manager 23) and a collection of menu management routines (the Menu Manager 25) to provide and display to the user the appropriate menu behavior. The Window Manager 23 and the Menu Manager 25 in turn make calls to code resources 17 and 21 within the application that specify window and menu contents and arrangement. Typically, these resources are in the form of window definition files and menu definition files, "WDEFs" and "MDEFs," respectively. The Window Manager and the Menu Manager then make calls to a collection of drawing routines 27, such as QuickDraw, to display the actual windows and menus on the computer screen 29.

As indicated by the dashed lines in FIG. 1, prior implementations of tear-off menus have required what may be described as a bifurcated event loop in which there are basically two paths for menu-related events: one through the Menu Manager for normal menu selection and one through the Window Manager for tear-off menus.

Not only do tear-off menus require developers to write custom MDEFs, they also require developers to implement custom support for floating windows in their applications. A floating window is one that always remains in the front-most window layer and can never be covered up by another window. This task has required intimate knowledge of the system software. No mechanism has existed to automatically support the menu-to-window transition. Next computers use a hybrid menu-palette in place of the usual application menus. The hybrid menu-palettes, however, are not "tear-off-able"; that is, they do not exhibit the dual behavior of first being anchored and then being torn off. The AUX (Apple Unix) operating system implements menus as windows. Again, tear-off menus are not explicitly supported.

What is needed, then, is a mechanism that explicitly supports tear-off menus in an efficient way that requires a minimum of application involvement.

SUMMARY OF THE INVENTION

The present invention, generally speaking, provides, at a system software level, explicit support for tear-off menus in a manner that requires a minimum of application-program interaction. All menus are transformed into windows and grouped in a single menu layer for each application, greatly simplifying many of the complexities of navigating through hierarchical and tear-off menus. Each application has its own menu layer that is shown and hidden as the application moves to the foreground and background. Tear-off menus, as with all menus, are hidden and shown with the menu layer, generating the desirable "floating-window" behavior. More particularly, in accordance with one embodiment of the invention, menus are managed in a graphical, event-driven computer system having a computer display by representing the menus as windows, providing a menu layer for containing menus of a computer program, and displaying a menu. Events occurring with respect to the menu layer are detected, in response to which display of the menu is varied.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

In order to unify treatment and handling of menus, both tear-off and hierarchical, all menus are transformed into windows and grouped in a single menu layer for each application. As a result, many of the complexities of navigating through hierarchical and tear-off menus are simplified. Each application has its own menu layer that is shown and hidden as the application moves to the foreground and background. Tear-off menus, as with all menus, are hidden and shown with the menu layer, generating the desirable "floating-window" behavior. The present arrangement therefore provides, at a system software level, explicit support for tear-off menus in a manner that is essentially application-transparent.

The term "layer" is used to refer to a grouping of windows which are associated with each other and move as a single coherent unit with respect to other layers. Windows in separate layer cannot ever be positioned in a fashion so that they are shuffled among one another.

Figure 1:
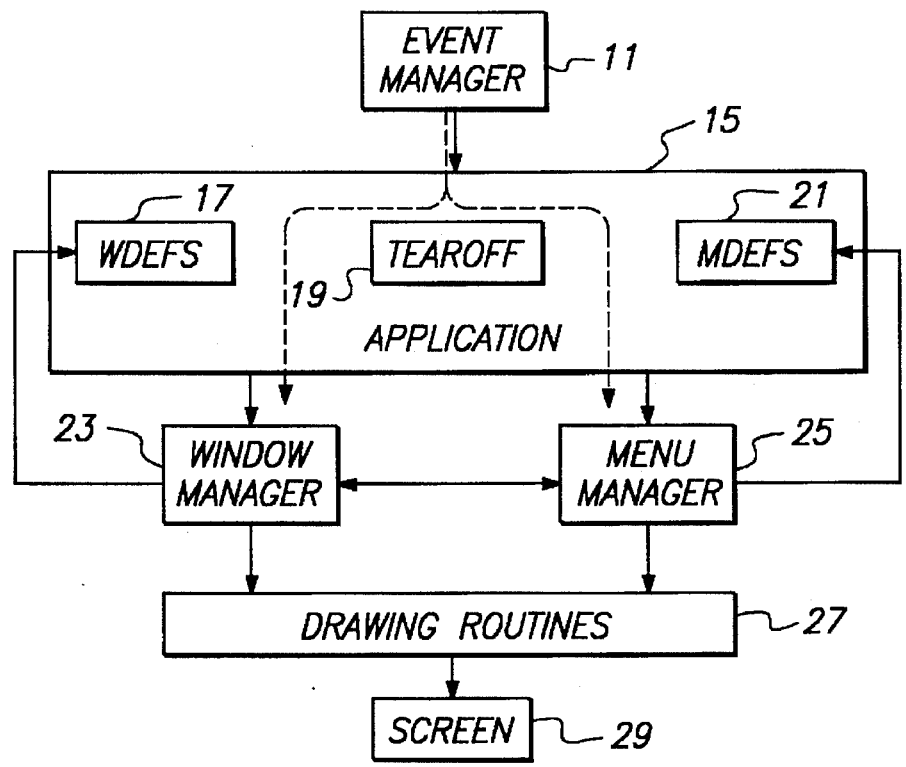
FIG. 1 is a block diagram showing a mechanism for implementing tear-off menus in accordance with the prior art.
Figure 2:
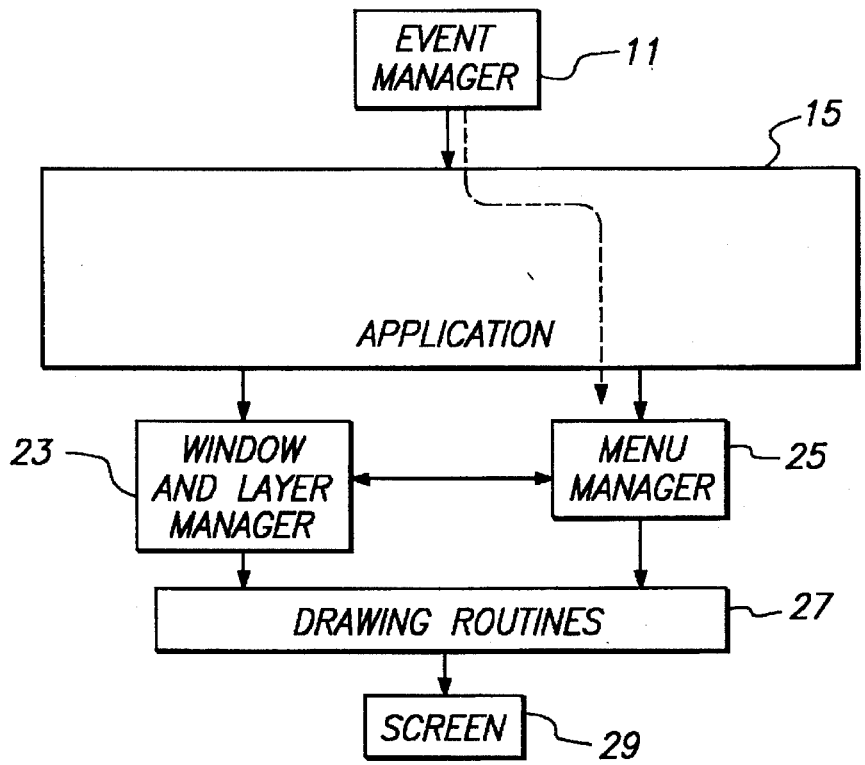
FIG. 2 is a block diagram showing a mechanism for implementing tear-off menus in accordance with the present invention.

Referring now to FIG. 2, layer and window management is combined in a Layer and Window Manager (referred to hereinafter simply as "Window Manager"). As compared to FIG. 1, no custom window definition files are required. Furthermore, the Menu Manager recognizes a defined tear-off gesture, relieving the application of the responsibility of determining when tear-off has occurred As indicated by the dashed lines in FIG. 2, as compared to prior implementations of tear-off menus, the present menu management arrangement has what may be described as a single unified event loop in which there is a single path for menu-related events: through the Menu Manager both for normal menu selection and for tear-off menus.

Using the combined Layer and Window Manager (referred to hereinafter simply as "Window Manager"), menus are implemented as windows. Each application "owns" two layers: one that is available through the Window Manager API (application program interface) to manage its document windows, and one accessible only through the Menu Manager API to manage all of its menus, both hierarchical and tear-off. User interaction (mouse clicks) are automatically routed to the Menu Manager in the right application context because they occur in a window layer that belongs to the application. This automatic routing gives developers the ability to add tear-off menus to their applications with only a bare minimum of additional code, as compared with the prior art in which the application had to provide its own support mechanism for tear-off menus.

The concept of one menu layer per application offers various advantages. One significant advantage is that, since each application's menu window layer is independent of every other, there is no possibility of cross-application interaction between menus, torn-off or otherwise. This feature becomes especially important in multi-threaded/multi-tasking systems.

By transforming all menus into windows and grouping them in a single menu window layer for each application, the event handling mechanism for windows, menus and tear-off menus becomes unified, achieving greater simplicity and efficiency. All of the screen display for menus and tear-off menus is handled automatically by the menu layer belonging to the application. User events are routed automatically via calls to FindWindow, a routine of the Window Manager. Using this arrangement, developer's do not have to implement any extra code to support tear-off menus.

The following description details the menu management process as implemented by the Window Manager and the Menu Manager of FIG. 2.

Figure 3:
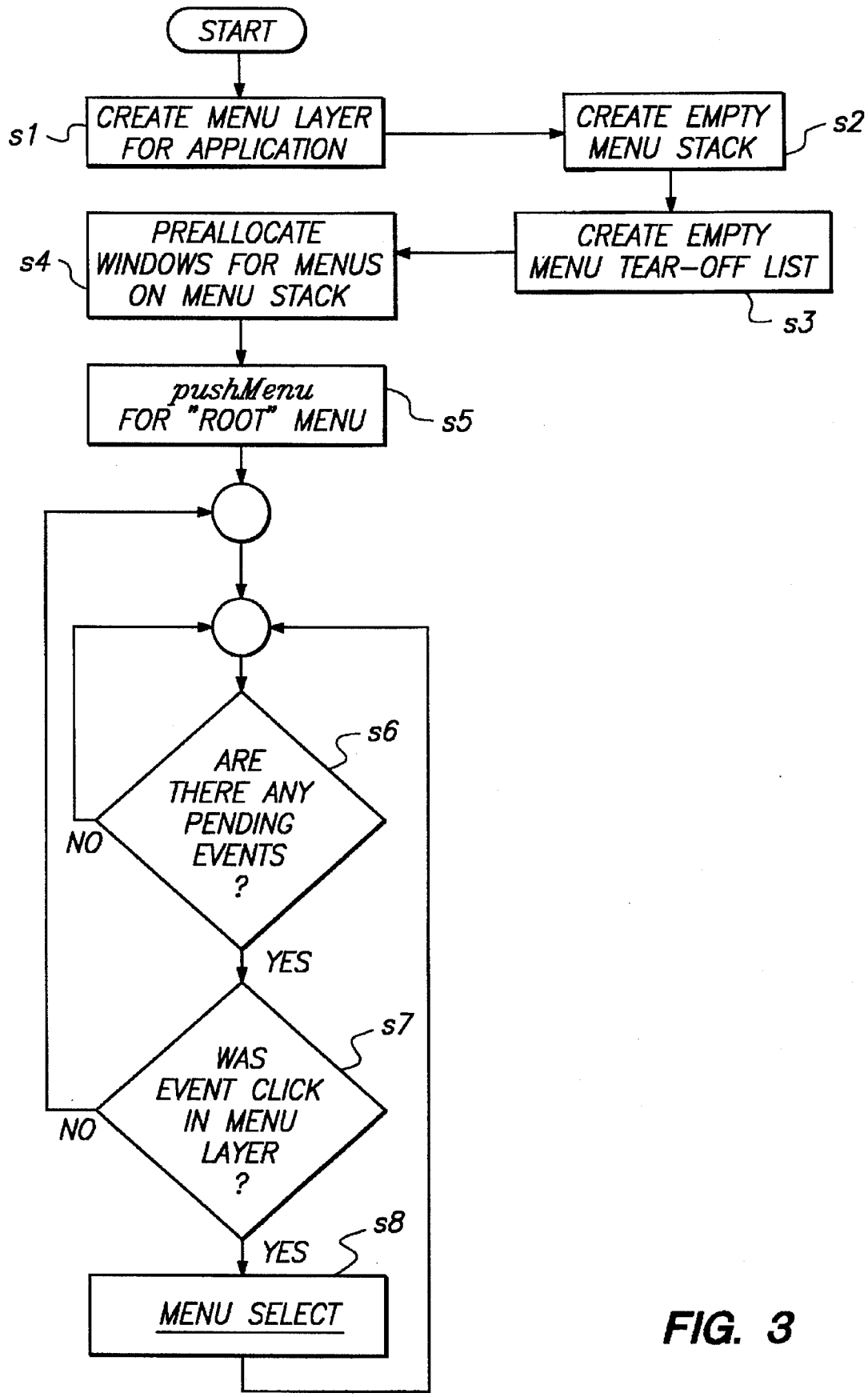
FIG. 3 is a flowchart showing menu-related activities at the application level.

Referring to FIG. 3, when an application is launched, a menu layer is created for the application (s1) by the application calling the Menu Manager. Each application that subscribes to Menu Manager services by calling the routines InitMenus or InitNewMenus receives its own menu layer, which is managed by the Window Manager. All menu window layers are grouped into the same layer priority, which is in front of all system windows but behind a window layer used for Balloon Help. After the menu layer has been created, the application calls the Menu Manager to create an empty menu stack (s2).

The menu stack is used to keep track of menus as they are drawn and erased in the process of a user navigating through hierarchical menus. As a user navigates deeper into hierarchical menus, they are added and removed from the menu stack. As with all stacks, menus must always be removed from the menu stack in the opposite order that they were added. The behavior of the stack is defined in accordance with the following operators:

| | |
|---|---|
| pushMenu | Adds a menu to the top of the stack and draws the menu in a window in front of all other menu windows. |
| popMenu | Erases the top-most menu in the menu stack and removes it from the stack. |
| getMenuStackElement | An accessor which returns the menu at a particular position in the stack with 0 |

| | |
|---|---|
| | designating the bottom-most menu. |
| getMenuStackSize | Returns how many menus are on the menu stack. |

Thus, the Menu Manager maintains a menu window stack for each menu layer and each application. This menu window stack is an ordered list of pre-allocated windows in the layer which are used to put up menus as they are drawn. As a user recursively navigates through menus and their hierarchical children during a menu selection routine MenuSelect (FIG. 3), menus are pushed onto and popped off of the menu stack. When a new menu is drawn, it is added to the stack, and when it is erased it is removed. For applications or services that need a menu bar, the menu stack always has a single menu in it corresponding to the menu bar and the root menu. The root menu is the highest-level menu in a menu hierarchy. (For example, the root menu in the Macintosh Finder, normally display upon boot-up, displays the menu items File, Edit, View, Label and Special in the menu bar). The root menu is never removed from the menu stack.

Each menu also maintains a list of menu tear-off windows. The windows in this list are not pre-allocated, but rather are dynamically allocated as menus are torn off. As menus are torn off, they are added to the tear-off menu list. The original menu window is hidden and it is popped of the menu stack. The Menu Manager then either 1) allocates a new window for the torn-off menu or 2) uses an already existing tear-off window for the menu if it has already been torn off. The same drawing code is then called to draw the tear-off window's contents as was called for the menu when it was on the menu stack. As the tear-off menus are dismissed by the user, they are removed from the list. A menu may be both on the menu stack and in the tear-off menu list at the same time.

Referring still to FIG. 3, after an empty menu stack has been created (s2), an empty tear-off menu list is created (s3). All menus that are either in the tear-off menu list or on the menu stack therefore have a window associated with them. All of these windows are kept in an independent layer which is separate from the application's document window layer. Windows are pre-allocated for menus to be placed on the menu stack (s4).

After windows have been pre-allocated for menus to be placed on the menu stack, the "root" menu, typically the menu bar, is pushed onto the stack using the pushMenu operator (s5). The application then enters an event loop (s6, s7, s8) in which it waits for and responds to user events in the form of mouse clicks.

In the event loop, if there are no pending events that have been passed to the application from the Event Manager, the application continues checking until it determines that an event is pending (s6). If the event click is determined (from an event code) to have been in the menu layer (s7), then the application calls a MenuSelect routine of the Menu Manager (s8). If the event click is determined to have not been in the menu layer, then the event is handled elsewhere in the application and the event loop continues to check for menu events. In order to determine whether the event click occurred in the menu layer, the application calls the Window Manager routine FindWindow.

Findwindow responds to mouse clicks in the currently visible (front-most) menu layer. If the click is in any window in the layer's menu stack or its tear-off list, FindWindow returns a result code of inMenuBar. This allows any clicks in tear-off menus to be automatically routed through a conventional event loop mechanism to MenuSelect, where the menu manager regains control. Hence the same menu selection algorithm can be used for determining a selection in the tear-off window as is used in normal menu selection. Hence, by integrating all application menus into a menu layer, developers can get the benefits of tear-off menus without writing any additional code. The application only has to make a single call to mark a menu as "tear-off-able", making that menu tear-off ready. Since a persistent copy of tear-off menus is displayed, the application must also ensure that the contents of the menu are always kept current and properly enabled and/or disabled, not just when the application is making calls to MenuSelect.

Figure 4:
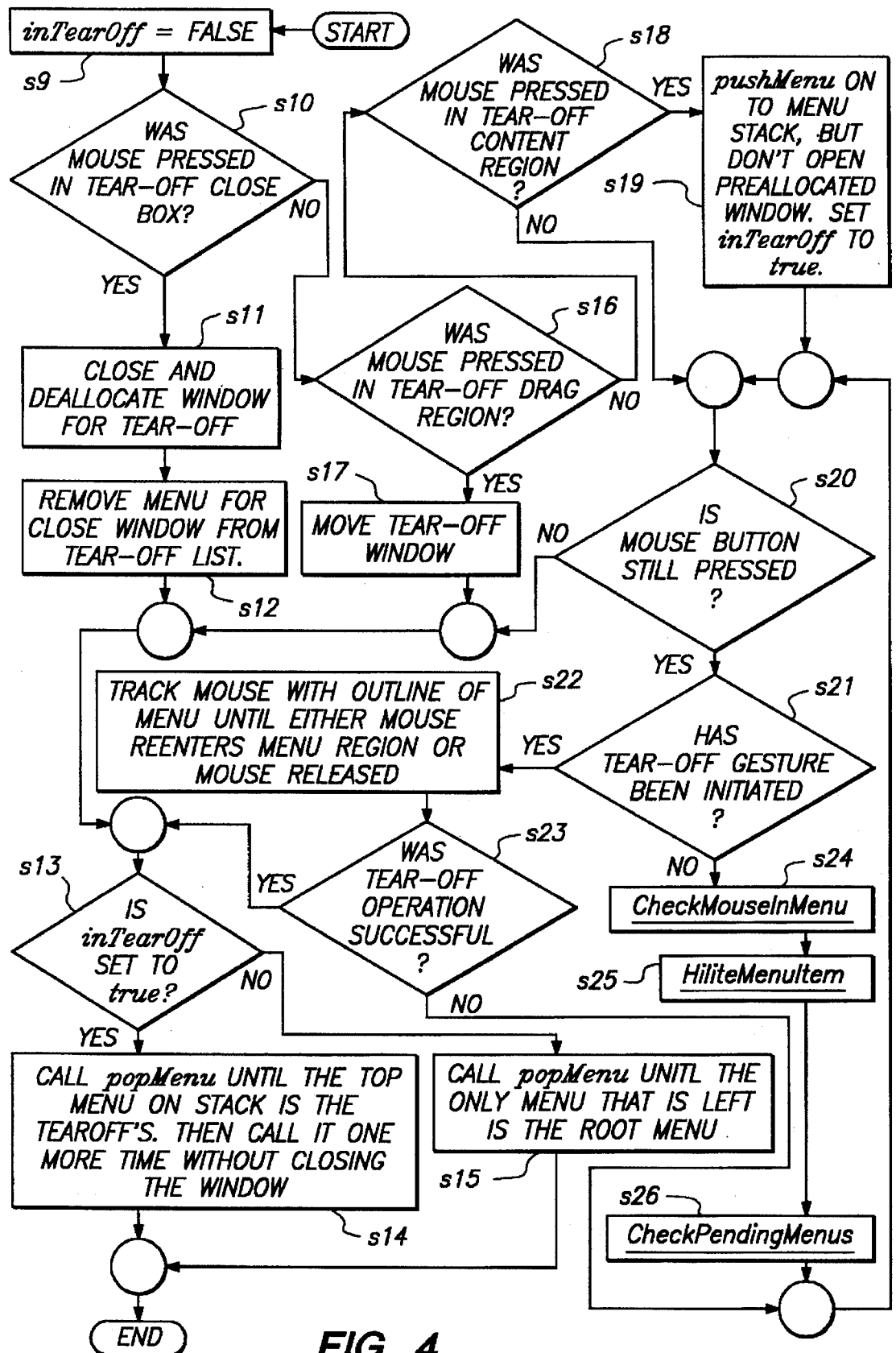
FIG. 4 is a flowchart showing a MenuSelect routine performed by the Layer and Window Manager and the Menu Manager of FIG. 2.

Referring to FIG. 4, if the event click occurred in the menu layer, then the MenuSelect routine is called in order to perform the appropriate menu management functions at the menu level (as opposed to the menu item level, for example). First, a variable inTearOff is set to false (s9). Then the routine checks to see whether the click occurred in the close box of a tear-off menu (s10). If so, the window for the tear-off menu is closed and deallocated (s11). Then the tear-off menu is removed from the tear-off menu list (s12). Since inTearOff remains set to false (s13), the menu navigator embodied in the MenuSelect routine pops all menus on the menu stack until the root menu of the tear-off menu that was the basis for this call to MenuSelect (s15).

If the click occurred not in the close box of a tear-off menu but in the drag region of a tear-off menu (s16), then the window of the tear-off menu is moved accordingly (s17), and the menu navigator does no operations on the menu stack because no additional items were added to the stack by MenuSelect (s13, s15). In other words, no operations are required because the top menu on the stack is already the tear-off menu of the root menu.

If the click occurred neither in the close box nor the drag region of a tear-off menu, but in the content region of a tear-off menu (s18), then the tear-off menu is pushed onto the menu stack (s19). However, no pre-allocated window is opened as with hierarchical menus. The variable inTearOff is set to true (s20).

Thereafter, if the mouse button is no longer pressed (s20), then, since inTearOff remains set to true (s13), popMenu is called until the top menu on the stack is the tear-off menu's (s14). Then popMenu is called one more time without closing the tear-off menu's window. If the mouse remains pressed (s20), since the menu is already a tear-off menu, the user is presumably preparing to select an item from the menu. Selection of an item from the menu is handled by calling the routines CheckMouseInMenu, HiliteMenuItem and CheckPendingMenus, in that order (s24, s25, s26).

If the click is determined not to have occurred in any part of a tear-off menu, then it must have occurred in a hierarchical menu or the root menu. The user may be preparing to tear off the menu or may be preparing to make a menu selection. If a predetermined tear-off gesture has been initiated (s21), then an outline of the menu is caused to follow the movement of the mouse (s22) until either the mouse re-enters the menu, in which case the tear-off operation is not successful (e.g., the user reconsidered), or until the mouse is released, in which case the tear-off operation is successful (s23).

If the tear-off operation was successful, then, since inTearOff remains set to false (s13), popMenu is called until the only menu that is left is the root menu (s15). If the tear-off operation was not successful, the routine loop backs to check whether the mouse button continues to be pressed (s20), and repeats.

Figure 5:
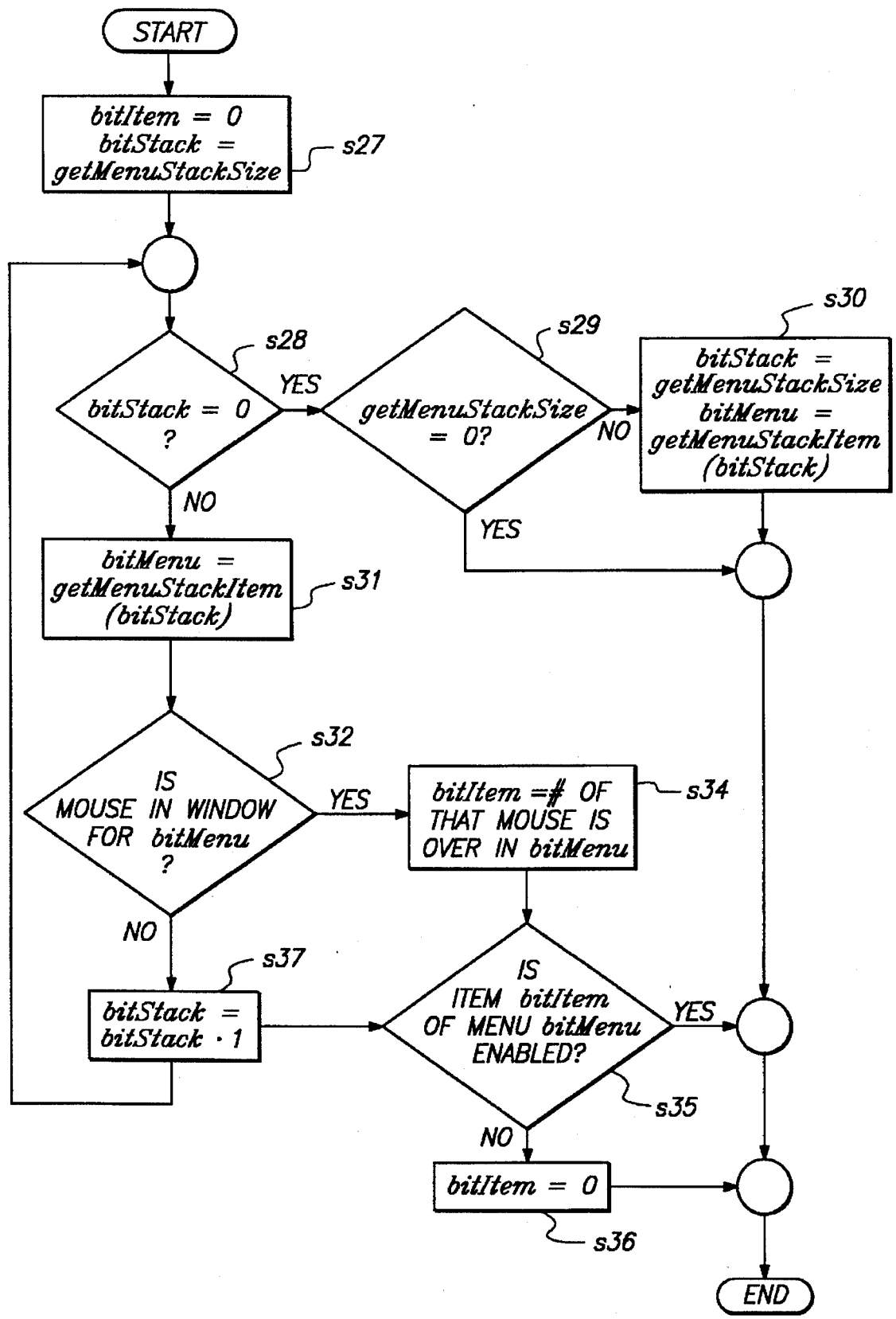
FIG. 5 is a flowchart showing in detail the CheckMouseInMenu routine of FIG. 4.

Once MenuSelect has taken care of possible tear-off menu set-up, a loop including the routines CheckMouseInMenu, HiliteMenuItem and CheckPendingMenus is executed for so long as the mouse button remains pressed in order to determined the mouse location, hilite and unhilite menus items, and display sub-menus as appropriate. Referring to FIG. 5, the CheckMouseInMenu routine essentially checks every menu on the menu stack to see if the mouse pointer is in that menu. Initially, a variable hitItem is set to zero, representing no item, and a variable hitStack, to function as a counter variable for use in checking each of the active menus, is set to the stack size using the operator getMenuStackSize (s27). At the beginning of the loop, the routine checks to see whether hitStack is zero, i.e., whether all the active menus have been checked (s28). If not, a variable hitMenu is set to the menu corresponding to the counter hitStack using the operator getMenuStackItem (s29). A determination is then made as to whether the mouse is in the window for hitMenu (s32). If not, the counter is decremented (s37), and the loop is repeated. If the mouse is in the menu window (s32), then hitItem is set to the number of the item that the mouse is over (s34). If that item is enabled (s35), then the routine concludes. If that item is not enabled, then hitItem is reset to zero (s36).

If the counter has been decremented to zero and still the mouse pointer has not been identified as being within any of the menus (s28), then a check is made (s29) to see if the menu stack is in fact empty (getMenuStackSize=0). If so, the routine concludes. If not (the mouse has been moved outside all of the active menus), then the counter hitStack is set to the stack size, thereby designating the menu on the top of the stack, and hitMenu is set to that menu using the operator getMenuStackItem(hitStack) (s30) in order to prepare for the following routine, HiliteMenuItem.

Figure 6:
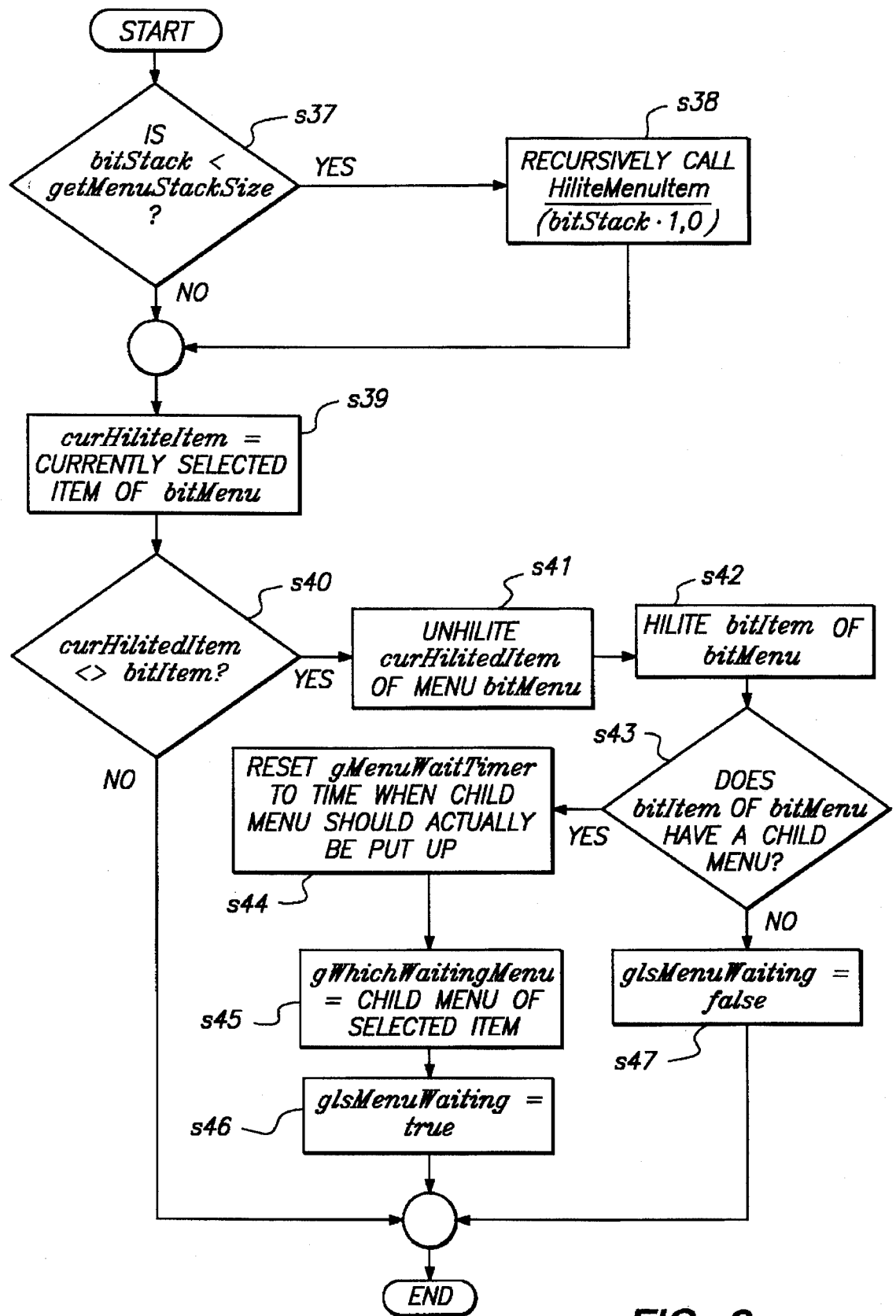
FIG. 6 is a flowchart showing in detail the HiliteMenuItem routine of FIG. 4.
Figure 7:
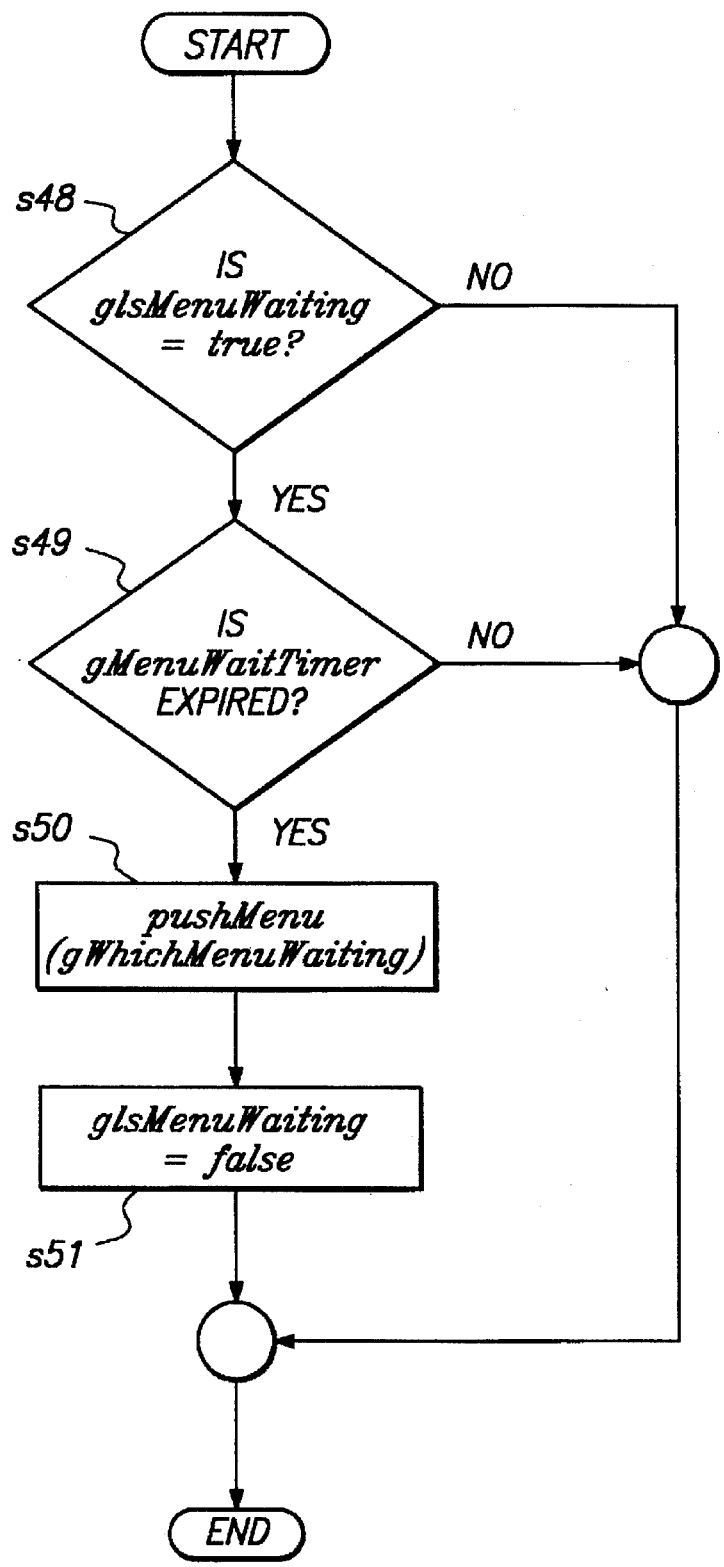
FIG. 7 is a flowchart showing in detail the CheckPendingMenus routine of FIG. 4.

Referring to FIG. 6, in HiliteMenuItem, any previously hilited menu items that should no longer be hilited are unhilited, the currently selected item of the hitMenu is hilited, and any sub-menu that might be associated with that menu item is scheduled for display. In order to unhilite previously hilited menu items that should no longer be hilited, if the current menu is not the top menu on the stack (hitStack<getMenuStackSize, s37), then HiliteMenuItem is called recursively for each menu below the current menu on the stack with no item selected (s38). In this manner, menu items previously hilited in these menus are unhilited.

More particularly, the recursive step occurs only when there are additional menus above the current one on the menu stack. The recursive step provides a way of forcing these menus to unhilite any items that may be hilited in them, as well as removing any menus on the menu stack that are deeper than a single layer deeper than the current menu.

Next, the currently selected item in the selected menu is hilited and any other menu item that might have been previously hilited is unhilited. The hilite is performed in the menu at stack location hitStack in the menu stack. To do this, first, a variable curHiliteItem is set to the currently hilited item of hitMenu (s39). Then a test is performed to see if this is the same item that the mouse pointer is currently over, hitItem (s40). If so, then no further action is necessary. If not, the currently hilited item is unhilited and hitItem is hilited (s41, s42).

If the hilited item has an associated sub-menu, that menu should be displayed after a certain delay to avoid visual distraction. In other words, the mouse must pause for a time over a menu selection before any sub-menu associated with that selection will be displayed. If the selected item does not have any sub-menu, or child menu (s43), then a global variable gIsMenuWaiting is set to false (s47). If the selected item does have a child menu, then a global variable gMenuWaitTimer is reset to the time when the child menu should actually be put up (s44). A global variable gWhichWaitingMenu is set to identify the child menu as the waiting menu (s45), and gIsMenuWaiting is set to true (s46).

In CheckPendingMenus, the waiting menu is displayed at the appointed time. First, gIsMenuWaiting is checked (s48). If it is false, the routine concludes. If it is true, a check is performed to see whether gMenuWaitTimer has expired (s49). If not the routine concludes. If so, the waiting child menu, gWhichMenuWaiting, is pushed onto the menu stack, causing it to be displayed (s50), and gIsMenuWaiting is set to false (s51).

By integrating all application menus into a menu layer, developers can get the benefits of tear-off menus without writing any additional code. The application only has to make a single call to mark a menu as "tear-off-able", making that menu tear-off ready. The application must, however, ensure that the contents of the menu are always kept current and properly enabled and/or disabled, not just when the application is making calls to MenuSelect.

It will be appreciated by those of ordinary skill in the art that the invention can be embodied in other specific forms without departing from the spirit or essential character thereof. The presently disclosed embodiments are therefore consideredin all respects to be illustrative and not restrictive. The scope of the invention is indicated by the appended claims rather than the foregoing description, and all changes which come within the meaning and range of equivalents thereof are intended to be embraced therein.

What is claimed is:

1. For use in a graphical, event-driven computer system having a computer display, a method of managing a plurality of menus of an application program, comprising the steps of:

representing each menu of the plurality of menus as a menu window co-extensive with said menu;

providing a display layer of related windows, said display layer being a menu window layer for containing each said menu window;

detecting a first event occurring with respect to the menu window layer;

in response to said first event, opening a menu window and displaying therein a corresponding menu;

detecting a second event occurring with respect to the menu layer; and in response to said second event, varying display of the menu window.

2. The method of claim 1, wherein said plurality of menus includes at least one tear-off menu.

3. The method of claim 2, wherein said corresponding menu is a tear-off menu.

4. The method of claim 3, wherein said plurality of menus includes a plurality of different types of menus including said tear-off menu and at least one of the following types of menus: pull-down, pop-up, and hierarchical.

5. The method of claim 4, comprising the further steps of:

providing a menu stack having a maximum depth; and for hierarchical menus, pre-allocating in computer memory a number of menu windows equal to the maximum depth of the menu stack.

6. The method of claim 4, comprising the further steps of:

providing a tear-off menu list;

in response to said second event, dynamically allocating in computer memory a menu window for a new tear-off menu not previously listed in the tear-off menu list; and adding the new tear-off menu to the tear-off menu list.

7. The method of claim 6, wherein said second event comprises a tear-off gesture.

8. The method of claim 6, comprising the further steps of:

detecting a third event with respect to the menu window layer;

dismissing said tear-off menu in response to said third event;

closing said menu window; and removing said tear-off menu from the tear-off menu list.

9. The method of claim 2, wherein the menu window layer contains exclusively all menus of a single application program.

10. For use in a graphical, event-driven computer system having a computer display, a computer-readable medium containing menu manager software including computer instructions for:

representing each of the menus of an application program, including both hierarchical menus and tear-off menus, as a menu window co-extensive with said menu;

providing a menu window layer for containing each said menu window;

providing a menu stack;

providing a tear-off menu list; and realizing an event handling mechanism for detecting events occurring with respect to the menu layer, for adding menu identifiers to and removing menu identifiers from the menu stack in response to predetermined events occurring with respect to the menu layer, and for adding tear-off menu identifiers to and removing tear-off menu identifiers from the tear-off menu list in response to other predetermined events occurring with respect to the menu layer.

* * * * *